(12) United States Patent
Kochura et al.

(10) Patent No.: US 10,599,773 B2
(45) Date of Patent: Mar. 24, 2020

(54) READING-DEVICE-BASED SOCIAL EVENT PREPARATION ENHANCEMENT

(71) Applicant: INTERNATIONAL BUSINESS MACHINES CORPORATION, Armonk, NY (US)

(72) Inventors: Nadiya Kochura, Bolton, MA (US); Fang Lu, Billerica, MA (US); Jingwei Yang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/905,129

(22) Filed: Feb. 26, 2018

(65) Prior Publication Data
US 2019/0266241 A1 Aug. 29, 2019

(51) Int. Cl.
G06F 17/27 (2006.01)
G10L 13/033 (2013.01)
G06F 17/28 (2006.01)

(52) U.S. Cl.
CPC ........ *G06F 17/2785* (2013.01); *G06F 17/289* (2013.01); *G10L 13/033* (2013.01)

(58) Field of Classification Search
CPC .... G06F 17/27; G06F 17/2785; G06F 17/279; G06F 17/289; G06F 17/30; G06F 16/168; G06F 16/638; G06F 16/338; G06F 16/438; G06F 16/538; G06F 16/738; G06F 16/838; G10L 13/033; G10L 13/0266; G10L 13/0275; G10L 13/0283; G10L 13/0291

USPC ........ 704/1–9, 200, 208, 211; 715/753, 716, 715/963, 817; 705/7.18, 7.22, 7.24, 705/14.61, 7.13, 7.12, 8, 9, 104.1, 705/FOR. 111

See application file for complete search history.

(56) References Cited

U.S. PATENT DOCUMENTS 4,807,154 A * 2/1989 Scully .................... G04G 11/00
345/1.1
5,317,683 A * 5/1994 Hager ................... G06Q 10/109
715/751

(Continued)

FOREIGN PATENT DOCUMENTS

WO 2004090835 A2 10/2004

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

Primary Examiner — Leshui Zhang
(74) Attorney, Agent, or Firm — Robert D. Bean

(57) ABSTRACT

According to one embodiment, a method, computer system, and computer program product for preparing a user for a presentation is provided. The present invention may include receiving user and event information; determining whether a user is making a presentation on one or more presentation topics at an event; determining whether a user wants to rehearse for the presentation at the event; receiving topic information relevant to the presentation topics; based on the user information and the event information, calculating a remaining time prior to the presentation; based on the remaining time and the topic information, creating a summary of the one or more presentation topics; and reading the summary to the user.

20 Claims, 5 Drawing Sheets

(56) References Cited

U.S. PATENT DOCUMENTS

| | | | | |
|---|---|---|---|---|
| 5,842,009 | A * | 11/1998 | Borovoy | G06Q 10/109 |
| 6,205,456 | B1 * | 3/2001 | Nakao | G06F 16/345 |
| | | | | 715/201 |
| 6,434,571 | B1 * | 8/2002 | Nolte | G06Q 10/109 |
| 7,530,021 | B2 * | 5/2009 | Cheng | G06Q 10/109 |
| | | | | 705/7.19 |
| 7,679,518 | B1 | 3/2010 | Pabla et al. | |
| 8,489,442 | B1 * | 7/2013 | Mohler | G06Q 10/1095 |
| | | | | 705/7.12 |
| 8,914,452 | B2 * | 12/2014 | Boston | G06K 9/00751 |
| | | | | 709/206 |
| 10,170,113 | B2 * | 1/2019 | Bastide | G10L 15/22 |
| 2003/0046296 | A1 * | 3/2003 | Doss | G06Q 10/109 |
| 2004/0023195 | A1 | 2/2004 | Wen et al. | |
| 2005/0256754 | A1 | 11/2005 | Nastacio | |
| 2007/0244847 | A1 * | 10/2007 | Au | G06F 17/2785 |
| | | | | 706/55 |
| 2008/0059265 | A1 * | 3/2008 | Biazetti | G06Q 10/063112 |
| | | | | 705/7.19 |
| 2009/0030766 | A1 | 1/2009 | Denner et al. | |
| 2014/0180697 | A1 * | 6/2014 | Torok | G10L 15/08 |
| | | | | 704/275 |
| 2014/0304023 | A1 * | 10/2014 | Li | G06Q 10/1097 |
| | | | | 705/7.21 |

OTHER PUBLICATIONS

Painter, "Tools You Can Use to Analyze Events—Attendee Events", https://attendee.events/tools-can-use-analyze-events/, Jan. 24, 2017, pp. 1-2.

Mynatt et al., "Inferring Calendar Event Attendance", IUI'01, Jan. 14-17, 2001, Santa Fe, New Mexico, USA, pp. 121-128.

Anonymously, "Method for Using Social Analytics to Dynamically Update Events in the Calendar", An IP.com Prior Art Database Technical Disclosure, IP.com No. IPCOM000245252D, IP.com Electronic Publication Date: Feb. 22, 2016, pp. 1-4.

Anonymously, "System for Dynamically Adjusted Reminder Entries", An IP.com Prior Art Database Technical Disclosure, IP.com No. IPCOM000245510D, IP.com Electronic Publication Date: Mar. 13, 2016, pp. 1-4.

Anonymously, "System for Delivery of Conference Artifacts During a Remote Conference", An IP.com Prior Art Database Technical Disclosure, IP.com No. IPCOM000204357D, IP.com Electronic Publication Date: Feb. 21, 2011, pp. 1-4.

Anonymously, "Calculating Anticipated Interpersonal Event Value by Analyzing Participant Expertise and Expectations", An IP.com Prior Art Database Technical Disclosure, IP.com No. IPCOM000212801D, IP.com Electronic Publication Date: Nov. 28, 2011, pp. 1-7.

Anonymously, "System and method of meeting preparation management in invitation", An IP.com Prior Art Database Technical Disclosure, IP.com No. IPCOM000227662D, IP.com Electronic Publication Date: May 10, 2013, pp. 1-6.

Anonymously, "System and method to analyse attendee interest at conference", An IP.com Prior Art Database Technical Disclosure, IP.com No. IPCOM000222187D, IP.com Electronic Publication Date: Sep. 24, 2012, pp. 1-4.

Gobl et al., "The role of voice quality in communicating emotion, mood and attitude", Speech Communication, vol. 40, Issues 1-2, Apr. 2003, pp. 189-212.

IBM, "Watson Discovery", https://www.ibm.com/watson/services/discovery/, printed on Jan. 12, 2018, pp. 1-10.

IBM, "Text to Speech", https://www.ibm.com/watson/services/text-to-speech!, printed on Jan. 12, 2018, pp. 1-5.

Swanson, "Is Your Tone of Voice Professional?", Careers by Jenn, https://www.careersbyjenn.com/2011/11/is-your-tone-of-voice-professional/, Nov. 4, 2011, Copyright Jennifer Swanson, Communication Diva, Vancouver, British Columbia, pp. 1-5.

IBM, "Language Translator", https://www.ibm.com/watson/developercloud/language-translator.html, printed on Jan. 12, 2018, pp. 1-5.

* cited by examiner

READING-DEVICE-BASED SOCIAL EVENT PREPARATION ENHANCEMENT

BACKGROUND

The present invention relates, generally, to the field of computing, and more particularly to natural language processing.

Natural language processing is a field of computing concerned with interactions between computers and natural human languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. As a result of the newfound ubiquity and power of natural language processing capable devices and software, new applications for natural language processing are transforming the way that users interface with machines, and making great improvements to users' everyday lives.

SUMMARY

According to one embodiment, a method, computer system, and computer program product for preparing a user for a presentation is provided. The present invention may include receiving user and event information; determining whether a user is making a presentation on one or more presentation topics at an event; determining whether a user wants to rehearse for the presentation at the event; receiving topic information relevant to the presentation topics; based on the user information and the event information, calculating a remaining time prior to the presentation; based on the remaining time and the topic information, creating a summary of the one or more presentation topics; and reading the summary to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
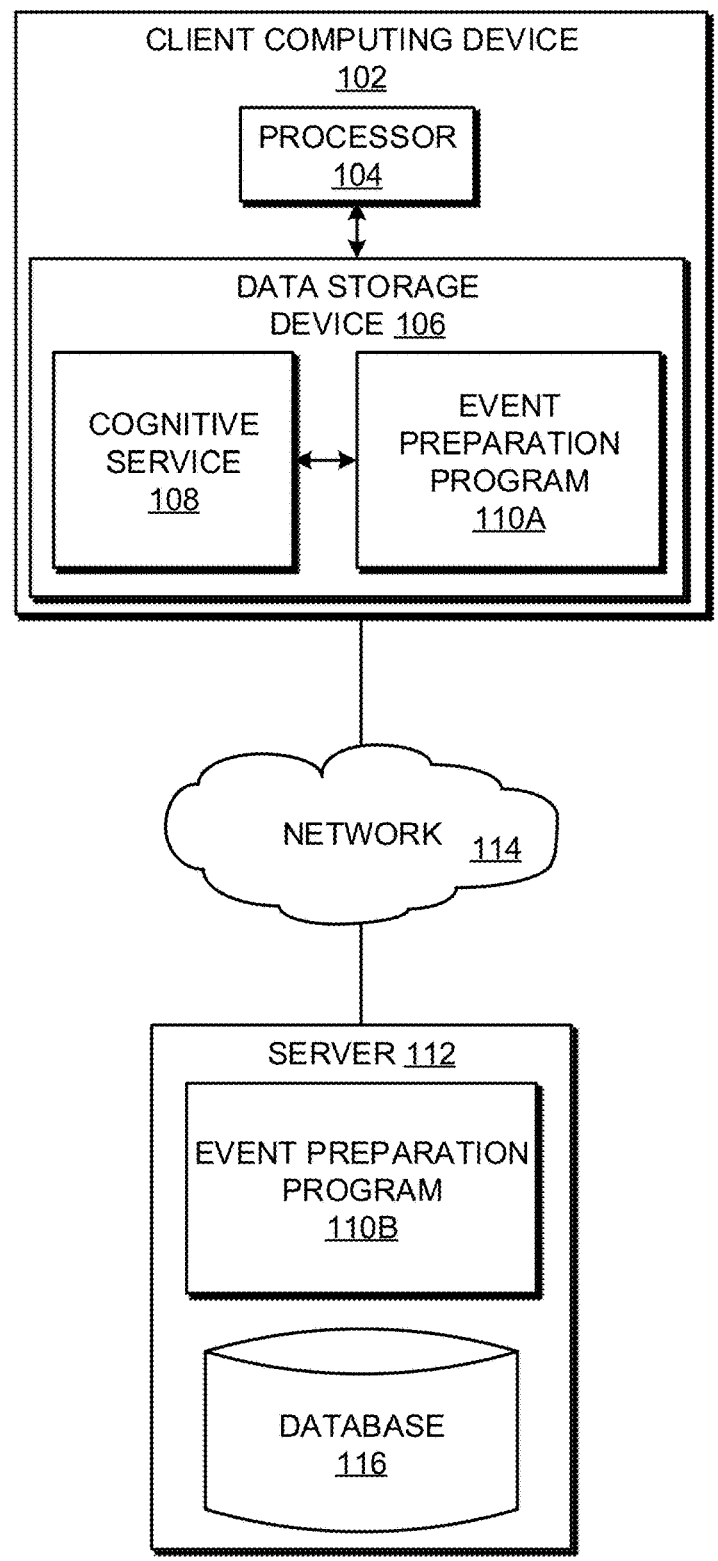
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, assess whether a user is presenting at an event, intelligently fashioning a summary of the presentation materials of the appropriate length and language, and reading the summary back to the user prior to the event. Therefore, the present embodiment has the capacity to improve the technical field of natural language processing by providing a heretofore unknown method of automatically creating, translating and reading aloud a summary of natural language elements, and modulating the tone appropriately.

As previously described, natural language processing is a field of computing concerned with interactions between computers and natural human languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. As a result of the newfound ubiquity and power of natural language processing capable devices and software, new applications for natural language processing are transforming the way that users interface with machines, and making great improvements to users' everyday lives.

People today are busier than ever. Packed schedules often create a situation where a person must quickly transition from one topic to another, such as in the case where one has two consecutive meetings on different topics. In situations such as these, it is easy to get mixed up between the multiple topics, or to forget which meetings are on which topics, or forget important details about the meeting content. This situation is exacerbated where a person must give presentations at one or more of these meetings; the hectic scheduling greatly increases the chance of a mistake or omission. In some cases, these meetings may even be in different languages, or contain audience members that speak multiple different languages. As such, there is a need to provide a 'recap' or a 'refresher' between meetings to allow individuals to accurately recall important points about the meeting and its topics, to minimize error or omission within presentations given by the individual, and to provide this refresher in the appropriate language. As such, it may be advantageous to, among other things, implement a system that intelligently summarizes the topic of a meeting or presentation, converts the summary into a relevant language, and reads the summary back to the user within the amount of time available between the meetings.

According to one embodiment, the invention may be a method of tracking a user's upcoming events, and determining if the user is making a presentation during each event. For events where the user is presenting, the method gathers information from various sources to create a summary of the topic or materials on which the user is presenting. The method, using both the location of the user as well as other location data and map services, determines the time remaining until the event, and the time the user has to rehearse before the event, and tailors the length and detail of the summary accordingly. The method also determines the language that the presentation ought to be given in, and if that language differs from the native language of the user but the user can still speak it, the method translates the summary into the appropriate language for the presentation. Finally, the method reads the summary to the user to refresh the user on the presentation topics, and may modulate the tone of the reading based on context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for assessing whether a user is presenting at an event, intelligently fashioning a summary of the presentation materials of the appropriate length and language, and reading the summary back to the user prior to the event.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a cognitive service 108 and an event preparation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an event preparation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Cognitive service 108 may be any program capable of interfacing with a user. It could be a home-based consumer system such as the Google Home® (Google Home® and all Google Home®-based trademarks and logos are trademarks or registered trademarks of Google Inc. and/or its affiliates) and Amazon Echo® (Amazon Echo® and all Amazon Echo®-based trademarks and logos are trademarks or registered trademarks of Amazon Technologies, Inc. and/or its affiliates), or it could be a cloud based service such as IBM Watson® (IBM Watson® and all IBM Watson®-based trademarks and logos are trademarks or registered trademarks of International Business Machines Corporation and/or its affiliates), or a mobile-device based system such as Ski® (Ski® and all Siri®-based trademarks and logos are trademarks or registered trademarks of Apple Inc. and/or its affiliates). In some embodiments, the cognitive service 108 interfaces with the user by audibly reading natural language text. In other embodiments, the cognitive service 108 may communicate with the user via text. Cognitive service 108 need not necessarily be located on computing device 102; cognitive service 108 may be located anywhere within communication of the event preparation program 110A, 110B, such as on computing device 102 or on any other device located within network 114. Furthermore, cognitive service 108 may be distributed in its operation over multiple devices, such as multiple different computing devices 102. In an alternate embodiment, cognitive service 108 may be an application or program distinct from but in communication with a voice-based virtual assistant.

According to the present embodiment, the event preparation program 110A, 110B may be a program capable of assessing whether a user is presenting at an event, intelligently fashioning a summary of the presentation materials of the appropriate length and language, and reading the summary back to the user prior to the event. The event preparation program 110A, 110B may be a standalone program, or may be used in conjunction with one or more cognitive services 108. In an alternate embodiment, event preparation program 110A, 110B may be in communication with human interface devices, such as audio sensors for detecting spoken natural language queries, keyboards for receiving natural language queries via text, and/or speakers for reading natural language text. The event preparation program 110A, 110B may be located on computing device 102 or on any device located within network 114. Furthermore, event preparation program 110A, 110B may be distributed in its operation over multiple devices, such as multiple client computing devices 102. The event preparation method is explained in further detail below with respect to FIG. 2.

Figure 2:
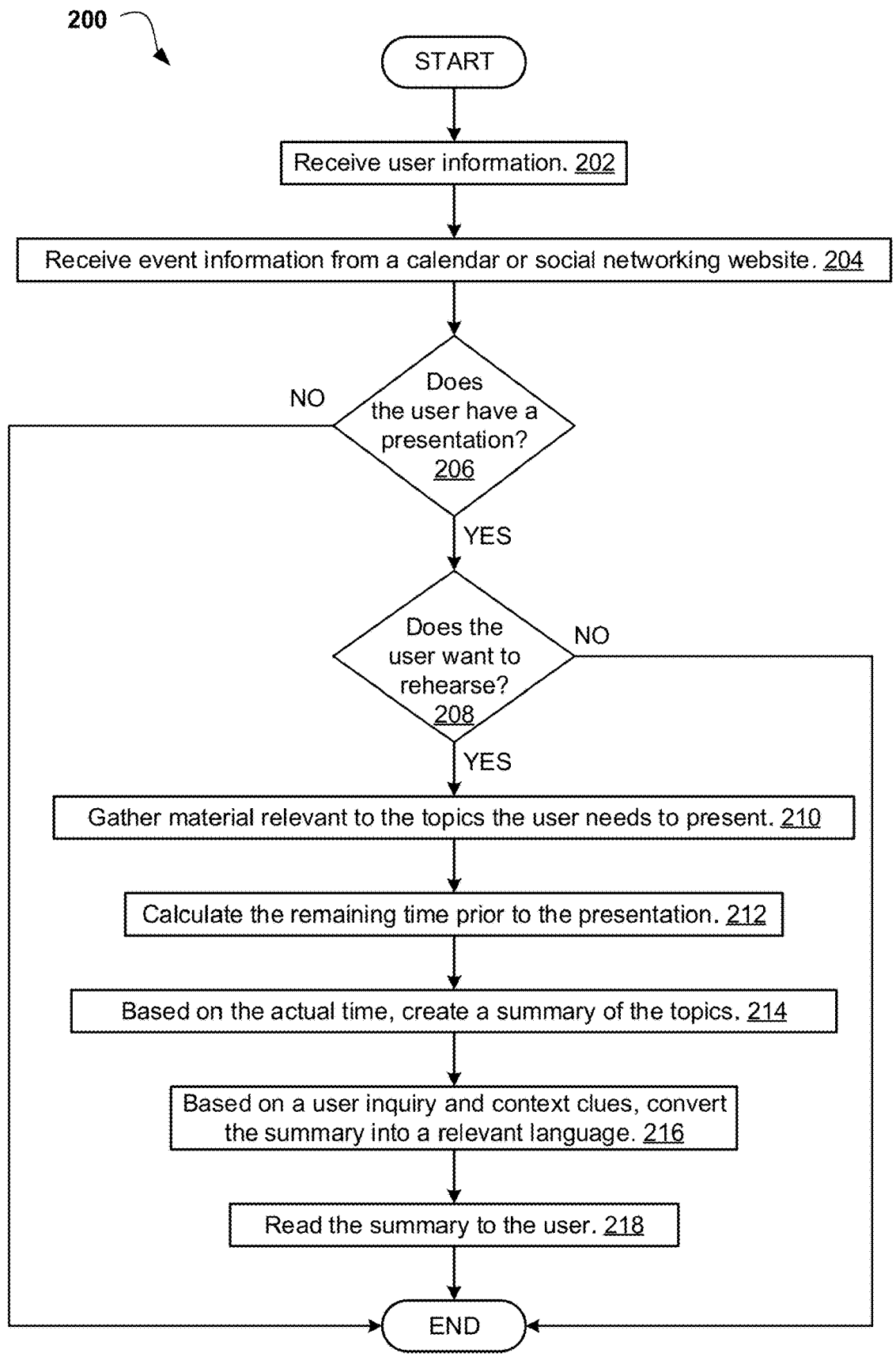
FIG. 2 is an operational flowchart illustrating an event preparation process according to at least one embodiment.

Referring now to FIG. 2, an operational flowchart illustrating an event preparation process 200 is depicted according to at least one embodiment. At 202, the event preparation program 110A, 110B receives user information. This information may include the calendar information of the user, including events that the user is attending, and whether the user is presenting. This information may also include the languages that the user speaks, information pertaining to the location of the user, such as the user's global positioning system (GPS) coordinates. This information may be received from an outside program, such as cognitive service 108 or the user's calendar or email applications. Alternately, this information may be received from a user directly in response to prompts, or crawled from a website such as a social media website, email database, text messages, professional profile on a business website, or a data repository such as data storage device 106 or database 116.

Next, at 204, event preparation program 110A, 110B receives event information from a calendar or social networking website. This information may include event information such as the location of the event, the time the event starts, the topics of presentation, and who will be presenting. The event information may further include information regarding the audience, including the audience's size, native language or languages, general age (for instance, older versus younger), proportion of women to men, knowledge domain, and level of proficiency on the topic. This information may be received from an outside program, such as cognitive service 108. Alternately, this information may be received from a user directly, or crawled from a social media website, calendar or email application, data repository such as data storage device 106 or database 116, or any other app or repository.

Then, at 206, event preparation program 110A, 110B determines whether the user has a presentation. The event preparation program 110A, 110B may make this determination through a variety of means, including communicating a prompt to the user via the user's mobile device, which may be achieved by event preparation program 110A, 110B or by cognitive service 108 or by any other app capable interfacing with the user at the behest of event preparation program 110A, 110B, and directly receiving an answer from the user. The event preparation program 110A, 110B may also make the determination by analyzing available data, such as the event data or agenda, to determine whether the user is listed among the presenters at the event. If the event preparation program 110A, 110B determines that the user does have a presentation to present at the event (step 206, "YES" branch), the event preparation program 110A, 110B may continue to step 208 to determine whether the user wants to rehearse. If the event preparation program 110A, 110B determines that the user does not have a presentation to present at the event (step 206, "NO" branch) the event preparation program 110A, 110B may terminate.

Then, at 208, the event preparation program 110A, 110B determines whether the user wants to rehearse. The event preparation program 110A, 110B may make this determination by communicating a prompt to the user via the user's mobile device, which may be achieved by event preparation program 110A, 110B or by cognitive service 108 or by any other app capable interfacing with the user at the behest of event preparation program 110A, 110B, and directly receiving an answer from the user. According to one implementation, if the event preparation program 110A, 110B determines that the user does want to rehearse, (step 212, "YES" branch), the event preparation program 110A, 110B may continue to step 210 to gather material relevant to the topics the user needs to present. If the event preparation program 110A, 110B determines that the user does not want to rehearse (step 212, "NO" branch), the event preparation program 110A, 110B may terminate.

Next, at step 210, event preparation program 110A, 110B gathers material relevant to the topics the user needs to present. This material may be gathered from internal databases of a company, from the email or calendar of the user, or other private data repositories or services. Additionally, material may be gathered from the user through use of a prompt to upload material; for instance, a prompt could direct a user to upload the slideshow presentation the user intends to present. If the presentation is on a topic where relevant information is available publicly, event preparation program 110A, 110B may search public domain websites, databases, and other locations for material. For example, if the presentation is on various commonly used engineering techniques, event preparation program 110A, 110B could pull information from online dictionaries and webpages about the relevant techniques. The event preparation program 110A, 110B may determine what topics are relevant by examining the event information, particularly the event title, presentation title and the title of other presentations given at the event, and subheadings of the presentation from the event agenda.

Then, at step 212, event preparation program 110A, 110B calculates the remaining time prior to the presentation. The event preparation program 110A, 110B may calculate the remaining time by determining the amount of time between the current time and the scheduled start of the presentation. The event preparation program 110A, 110B may also take into account whether the user has events or errands or other factors that may reduce the amount of time the user has to prepare. The event preparation program 110A, 110B may further take into account the amount of time it will take for the user to reach the location of the event, for instance using the GPS coordinates of the user and calculating the distance to the address or GPS coordinates of the event. The event preparation program 110A, 110B may further interact with a navigation application to determine travel time to the event. The remaining time may be distinct from an actual time, which may be the time within which the event preparation program 110A, 110B may present a summary; as an example, user John may have 30 minutes of remaining time before his presentation, where 20 minutes of that time are spent driving to the meeting location and 10 minutes are spent on an errand on the way. The event preparation program 110A, 110B may therefore determine that there are 30 minutes of remaining time, but only 20 minutes of actual time remaining to read a summary aloud to John as he drives.

Next, at 214, event preparation program 110A, 110B creates a summary of the topics based on the actual time. The summary is an abbreviated version of the information relevant to the presentation; the summary may be organized around the bullet points or headings/subheadings taken from the meeting agenda or other event information or presentation material, with more or less detail and more or fewer headings/subheadings included depending on the desired length of the summary, where the desired length is proportional to the actual time. If the user has more time then event preparation program 110A, 110B can help him/her prepare the presentation in greater detail, for instance, by including a greater amount of relevant information in the summary. If the user does not have much time then event preparation program 110A, 110B may only provide him/her with a quick refresh version of the presentation, by scaling down the presentation to only its important points.

Then, at 216, event preparation program 110A, 110B converts the summary into a relevant language based on a user inquiry and context clues. The event preparation program 110A, 110B may determine which language the presentation should be conducted in; in one embodiment, event preparation program 110A, 110B may do so by searching the event information for the preferred language or languages of the audience, the language that the agenda is written in, and other such clues. The event preparation program 110A, 110B may also search the user information to determine the languages the user speaks, and may take into account the language of the operating system of the device on which event preparation program 110A, 110B is run, to determine the languages that the user speaks. If more than one significant fraction of the audience speaks a different language that the user also speaks, the event preparation program 110A, 110B may send a prompt to the user asking if the user wants to present in any other of the languages with which the user is fluent. Depending on the user response, event preparation program 110A, 110B may convert the summary into one or more additional languages using translation tools. As an example, event preparation program 110A, 110B detects the customers comprising the audience are from France, and user John is able to make the presentation in French. The event preparation program 110A, 110B can detect such user profile data from John's professional networking profile or the company's corporate profile information. The event preparation program 110A, 110B uses a machine translation tool to translate the information from English to French.

Next, at 218, event preparation program 110A, 110B reads the summary to the user. The event preparation program 110A, 110B may read the summary aloud by communicating with a speaker, or may send the summary to another application or program, such as cognitive service 108, to be read aloud. The speed with which the summary is read may be increased from a default value if there is not much actual time remaining, such that it takes less time to read the summary. The tone with which the summary is read may be modified by event preparation program 110A, 110B in response to event information; as an example, a presentation on excellent quarterly results may merit a buoyant, optimistic tone, while a presentation regarding workplace disciplinary incidents may merit a more somber, serious tone. In the event that the presentation is to be given in multiple languages, event preparation program 110A, 110B may read a summary in each of the indicated languages. In other embodiments, the summary may be communicated to the user via text.

It may be appreciated that FIG. 2 provides only an illustration of one implementation and does not imply any limitations with regard to how different embodiments may be implemented. Many modifications to the depicted environments may be made based on design and implementation requirements. In some embodiments of the invention, instead of terminating if the user does not have a presentation, event preparation 110A, 110B may ask the user if the user wishes for a refresher on the subject of the event; if the user responds affirmatively, event preparation program 110A, 110B may gather materials regarding the topic of the event and prepare a summary for the user, which it may then read to the user.

Figure 3:
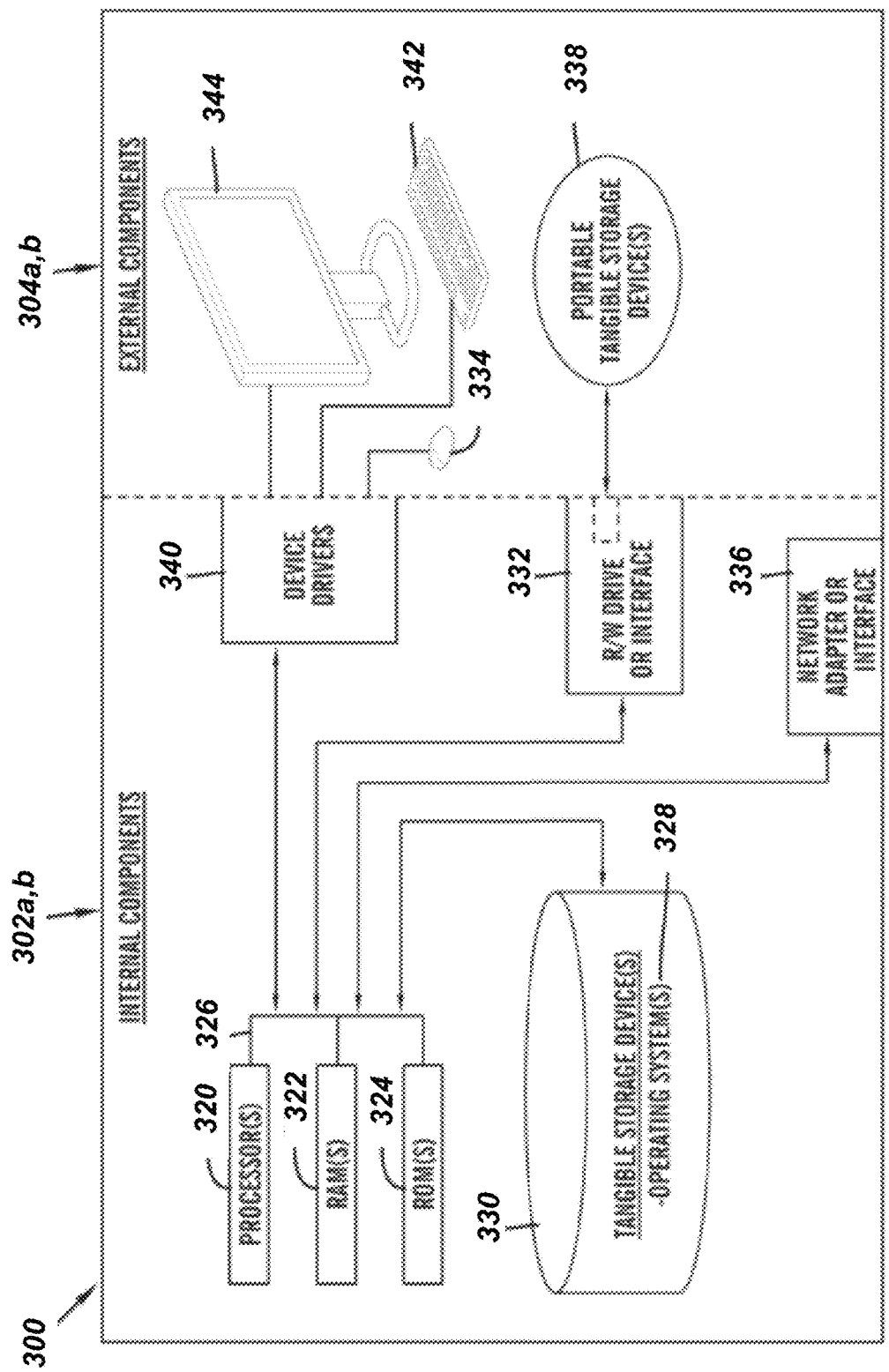
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the cognitive service 108 and the event preparation program 110A in the client computing device 102, and the event preparation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the event preparation program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The cognitive service 108 and the event preparation program 110A in the client computing device 102 and the event preparation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the cognitive service 108 and the event preparation program 110A in the client computing device 102 and the event preparation program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
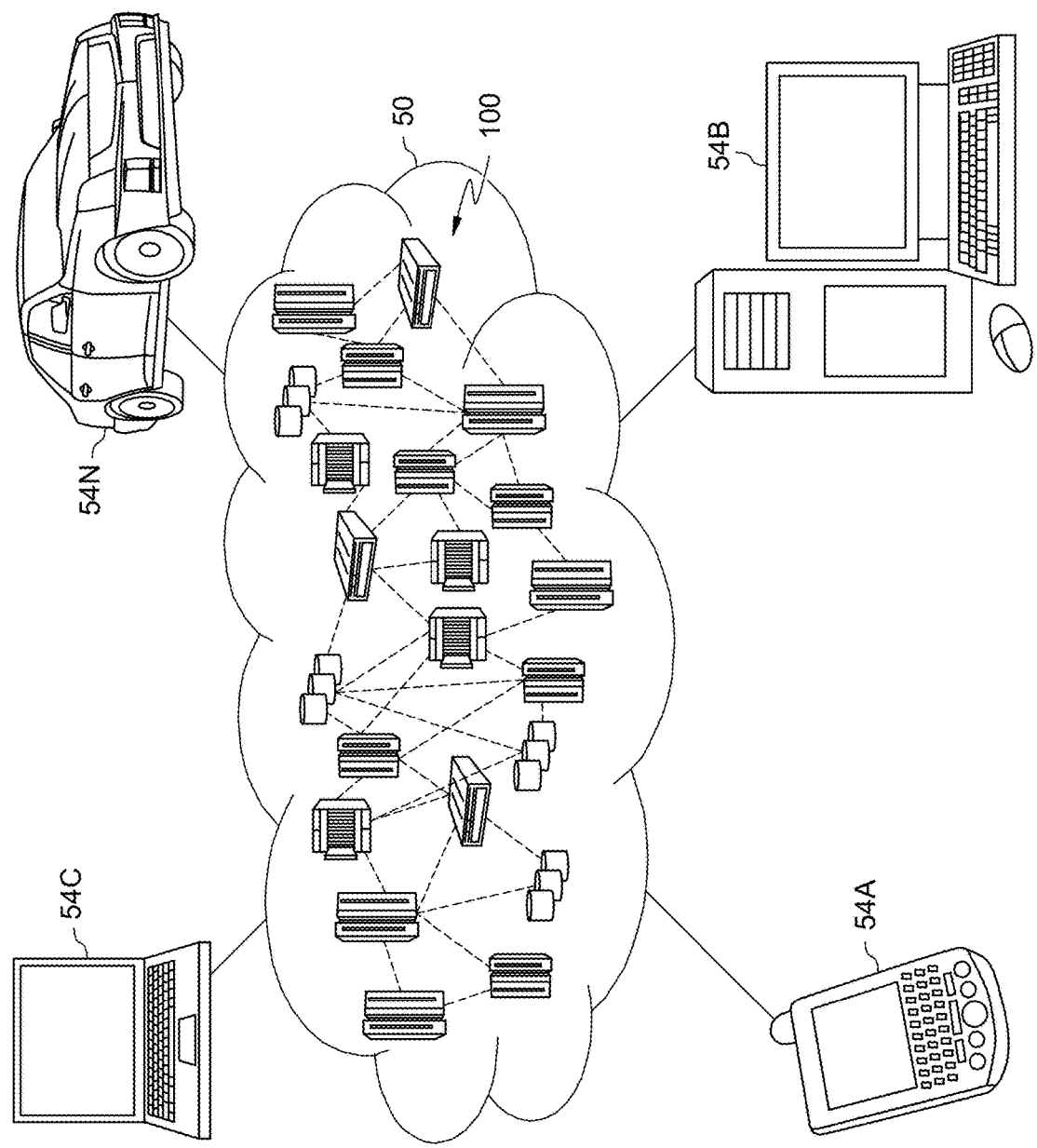
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
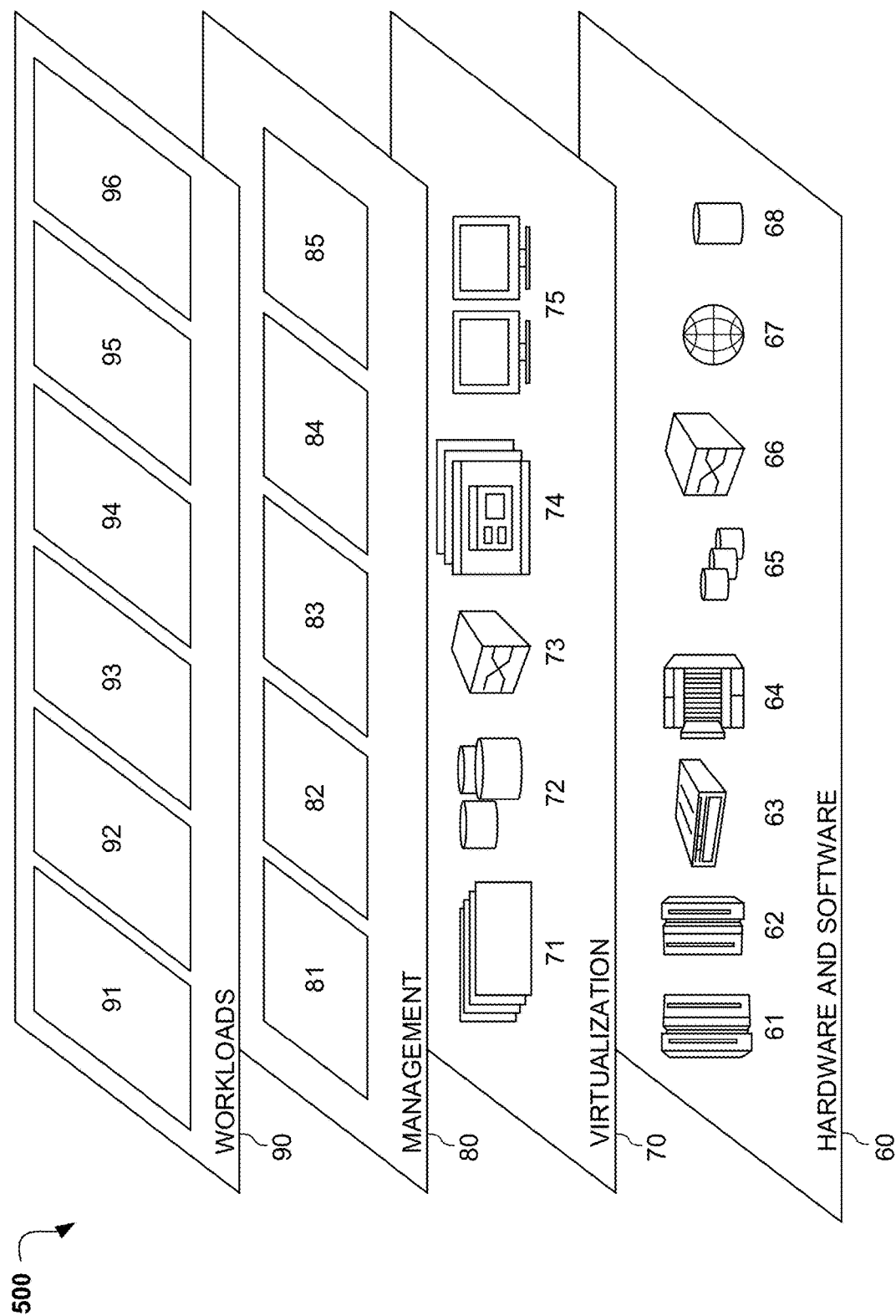
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event preparation 96. Event preparation 96 may relate to assessing whether a user is presenting at an event, intelligently fashioning a summary of the presentation materials of the appropriate length and language, and reading the summary back to the user prior to the event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for automatically creating a summary for a user giving a presentation, the method comprising:
   crawling a plurality of user information and a plurality of event information from one or more data repositories on a network, wherein the user information and event information each comprise a plurality of text;
   determining, based on natural language processing of the plurality of user information and the plurality of event information, one or more presentation topics pertaining to the presentation at the event;
   operating a mobile device to determine whether the user wants to rehearse for the presentation at the event through one or more prompts on the mobile device;
   responsive to an affirmative user selection based on the one or more prompts on the mobile device, receiving a plurality of topic information relevant to the one or more presentation topics;
   based on the plurality of user information and the plurality of event information, calculating a remaining time prior to the presentation;
   based on the remaining time and natural language processing of the plurality of topic information, creating the summary of the one or more presentation topics; and
   operating the mobile device to read the summary to the user via at least one speaker.

2. The method of claim 1, further comprising:
   calculating an actual time based on a location of the user and a geographical distance from an event location.

3. The method of claim 2, wherein the reading of the summary is conducted with a speed commensurate with an amount of the actual time.

4. The method of claim 2, wherein a length and a detail of the summary are based on the actual time.

5. The method of claim 1, wherein the reading of the summary is conducted in a tone appropriate to a context of the event, based on the plurality of event information and the plurality of topic information.

6. The method of claim 1, further comprising:
   based on the plurality of user information and the plurality of event information, translating the summary into one or more additional languages.

7. The method of claim 1, wherein the one or more additional languages are languages spoken both by one or more members of an audience of the event, and by the user.

8. A computer system for automatically creating a summary for a user giving a presentation, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   crawling a plurality of user information and a plurality of event information from one or more data repositories on a network, wherein the user information and event information each comprise a plurality of text;
   determining, based on natural language processing of the plurality of user information and the plurality of event information, one or more presentation topics pertaining to the presentation at the event;
   operating a mobile device to determine whether the user wants to rehearse for the presentation at the event through one or more prompts on the mobile device;
   responsive to an affirmative user selection based on the one or more prompts on the mobile device, receiving a plurality of topic information relevant to the one or more presentation topics;
   based on the plurality of user information and the plurality of event information, calculating a remaining time prior to the presentation;
   based on the remaining time and natural language processing of the plurality of topic information, creating the summary of the one or more presentation topics; and
   operating the mobile device to read the summary to the user via at least one speaker.

9. The computer system of claim 8, further comprising:
calculating an actual time based on a location of the user and a geographical distance from an event location.

10. The computer system of claim 9, wherein the reading of the summary is conducted with a speed commensurate with an amount of the actual time.

11. The computer system of claim 9, wherein a length and a detail of the summary are based on the actual time.

12. The computer system of claim 8, wherein the reading of the summary is conducted in a tone appropriate to a context of the event, based on the plurality of event information and the plurality of topic information.

13. The computer system of claim 8, further comprising:
based on the plurality of user information and the plurality of event information, translating the summary into one or more additional languages.

14. The computer system of claim 8, wherein the one or more additional languages are languages spoken both by one or more members of an audience of the event, and by the user.

15. A computer program product for automatically creating a summary for a user giving a presentation, the computer program product comprising:
one or more computer-readable non-transitory tangible storage medium and program instructions stored on at least one of the one or more non-transitory tangible storage medium, the program instructions executable by a processor to cause the processor to perform a method comprising:
crawling a plurality of user information and a plurality of event information from one or more data repositories on a network, wherein the user information and event information each comprise a plurality of text;
determining, based on natural language processing of the plurality of user information and the plurality of event information, one or more presentation topics pertaining to the presentation at the event;
operating a mobile device to determine whether the user wants to rehearse for the presentation at the event through one or more prompts on the mobile device;
receiving a plurality of topic information relevant to the one or more presentation topics;
based on the plurality of user information and the plurality of event information, calculating a remaining time prior to the presentation;
based on the remaining time and natural language processing of the plurality of topic information, creating the summary of the one or more presentation topics; and
operating the mobile device to read the summary to the user via at least one speaker.

16. The computer program product of claim 15, further comprising:
calculating an actual time based on a location of the user and a geographical distance from an event location.

17. The computer program product of claim 16, wherein the reading of the summary is conducted with a speed commensurate with an amount of the actual time.

18. The computer program product of claim 16, wherein a length and a detail of the summary are based on the actual time.

19. The computer program product of claim 15, wherein the reading of the summary is conducted in a tone appropriate to a context of the event, based on the plurality of event information and the plurality of topic information.

20. The computer program product of claim 15, further comprising:
based on the plurality of user information and the plurality of event information, translating the summary into one or more additional languages.

* * * * *